UNITED STATES PATENT OFFICE.

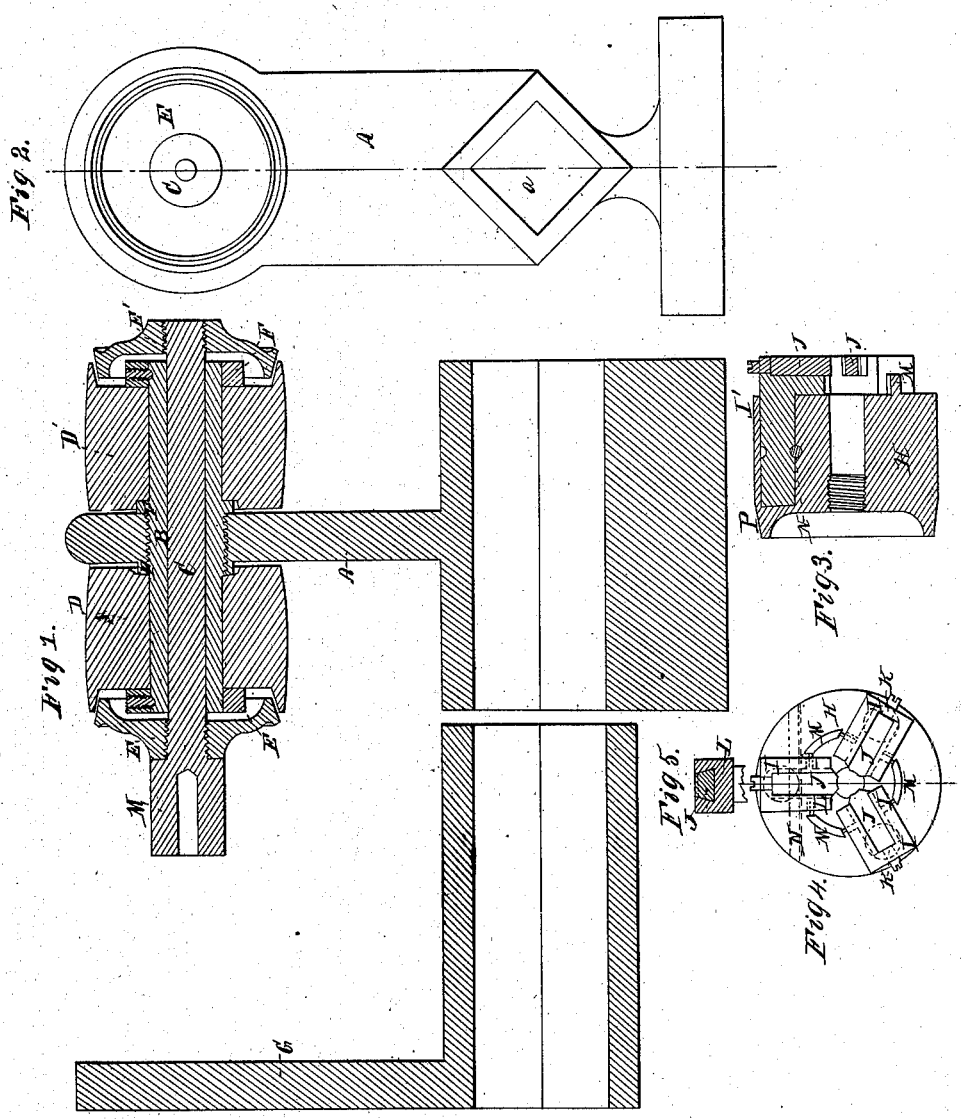
L. Yale, Jr.,
Cutting Screws,
Nº 48,476. Patented June 27, 1865.

LINUS YALE, JR., OF SHELBURNE FALLS, MASSACHUSETTS.

APPARATUS FOR REVERSING THE MOTION OF SCREW-TAPS.

Specification forming part of Letters Patent No. 48,176, dated June 27, 1865.

*To all whom it may concern:*

Be it known that I, LINUS YALE, Jr., of Shelburne Falls, in the county of Franklin and State of Massachusetts, have invented certain new and useful apparatus applicable to the threading of screws and tapping of nuts speedily and efficiently; and I do hereby declare that the following, taken in connection with the drawings, is a full, clear, and exact description thereof.

In the drawings, Figure 1 is a longitudinal section through the apparatus. Fig. 2 is an elevation of the head-block; Fig. 3, a longitudinal section through a part of a clutch, a die-head, die-holders, and dies; Fig. 4, an end elevation thereof, and Fig. 5 a transverse section through a die-holder and die.

In the manufacture of short screws and nuts of the smaller class the former are, with the exception of wood-screws, usually cut or threaded by dies embracing the screw and rotating and advancing as they cut. The latter are tapped out by taps entering into and retreating out of a hole punched or drilled in the nut-blank.

My improvement relates to this plan of making screws and nuts, and enables a workman, by the mere act of exerting pressure in different directions, to cause either a tap or die to rotate in different directions, so as to traverse a screw-thread alternately from one end to the other, and then back again.

In the drawings, a head-block is represented at A. This head-block may be made fast to a table or stand, or, as I prefer, be provided with a hole, *a*, by means of which it may be mounted upon a lathe-bar. In this head-block is firmly secured a sleeve, B, and upon this sleeve are mounted two pulleys, D D', so fitted as to turn easily on the sleeve, and being prevented from moving longitudinally thereon by collars F F, or any other contrivance suitable for the purpose. The ends of these pulleys, at the outer ends of the sleeve, have a conical recess formed in them, as clearly indicated in the drawings. A live-spindle, C, is passed through the tube or sleeve, and upon each end of it are screwed, keyed, or otherwise secured two disks, E E', whose inside surfaces are formed into counterparts of the conical recesses in the ends of the pulleys. The disks and recessed ends of the two pulleys constitute two friction-clutches, and the distance between the cones on the disks bears such relation to the distance between their counterparts on the pulleys that when the parts of one clutch are in contact the parts of the other are out of contact, and vice versa. The pulleys D D' are to be kept in revolution in opposite directions during the operation of the machine by two belts, which may be driven from pulleys on a counter-shaft, one of the belts being crossed. A tap holder, M', may be secured either to the live-spindle or one of the disks. If a nut-blank be now secured to the standard G, mounted on a lathe-bar, and advanced toward and into contact with the tap, the pressure will slide the spindle and disks endwise, causing the disk E to come in contact with and revolve with the pulley D, which should rotate in such direction as to cause the tap to enter the nut and commence a thread. When the tap has entered far enough the nut is to be drawn away from the tap. In doing this E will be drawn away from D, when the spindle and tap will cease to revolve, and E' will then be brought into contact with D', causing the spindle and tap to revolve in the opposite direction, and thus to retreat out of the nuts. By a succession of such operations the nut can be tapped. The live-spindle may be made hollow, and the nut-blank secured so as to revolve with the spindle, in which case the tap may be attached to the standard G.

In cutting screws I prefer to form one end of the die-head conical, as at P, so that it becomes both die-head and part of a clutch, and to attach the die-head to the spindle; but it may be secured to one of the disks, or the screw-blanks may be secured to either the spindle or one of the disks, and the die-head in that case must not revolve.

In the drawings I have shown a die-head in which the dies J are mounted on carriages or die-holders I and are advanced to their work by screws K. The carriages are free to oscillate upon spindles I', making part of or attached to the carriages, and the arc through which the dies can vibrate is regulated by stops M, attached to the head, and set-screws L, attached to the holders. By this method of mounting the carriages the dies actually become chasing-tools, and their cutting-edges are relieved when the dies are returning to the point where the cutting of the screw was commenced, and both corners of each die may have cutting-edges, so that they will cut while traversing over the thread in both directions.

When screws are cut with this apparatus a force tending to separate the screw and dies will cause the latter to revolve in one direction, and a force tending to make them approach will cause the die to revolve in the opposite direction, so that the die will traverse the screw in both directions, with a proper direction of revolution for each traverse by merely pushing or pulling the blank.

Any sort of clutch may be substituted for the one represented in the drawings so long as it is of such character that it will be thrown in and out of contact by an endwise motion of a shaft or spindle, to which one part of the clutch is attached; but parts of both clutches must be attached to the same spindle, and that spindle must be capable of moving endwise with respect to the pulleys.

I claim as of my own invention in the herein-described contrivance for making screws and nuts—

The combination of two recessed pulleys with two corresponding disks to clutch therewith, and a live-spindle to which the latter are attached, arranged substantially as described, so that the spindle can be clutched to either pulley and made to rotate in accordance with the motions thereof by a force employed to push or to pull said spindle longitudinally in either direction, substantially as described.

In testimony whereof I have hereunto subscribed my name.

LINUS YALE, Jr.

In presence of—
ARTHUR MAXWELL,
HENRY WINN.